(12) United States Patent
Norris (10) Patent No.: US 7,682,503 B1
(45) Date of Patent: Mar. 23, 2010

(54) FILTRATION AND SURGE WITH NO MOVING PARTS

(76) Inventor: Joe Norris, 702 Lang Farm Dr., Medina, OH (US) 44256

( * ) Notice: Subject to any disclaimer, the term of this patent is extended or adjusted under 35 U.S.C. 154(b) by 0 days.

(21) Appl. No.: 12/283,251

(22) Filed: Sep. 10, 2008

Related U.S. Application Data

(63) Continuation-in-part of application No. 11/284,123, filed on Nov. 4, 2005, now abandoned.

(51) Int. Cl.
*A01K 63/04* (2006.01)
*C02F 3/32* (2006.01)

(52) U.S. Cl. ............... 210/167.21; 210/167.22; 210/167.26; 210/188; 210/220; 210/416.2; 210/602; 119/260; 119/261; 119/263

(58) Field of Classification Search ............ 210/602, 210/604, 167.21, 167.22, 167.26, 188, 220, 210/416.1, 416.2; 119/259–263, 267
See application file for complete search history.

(56) References Cited

U.S. PATENT DOCUMENTS 2,270,869 A * 1/1942 Ditto et al. ............ 210/622
3,768,200 A * 10/1973 Klock ................... 47/1.4
3,994,811 A * 11/1976 Cohen et al. ........... 210/167.25
5,055,186 A * 10/1991 Van Toever .............. 210/150
5,298,164 A * 3/1994 Hapach et al. ........... 210/604
5,753,114 A * 5/1998 Steege .................. 210/167.22
5,755,961 A * 5/1998 Limcaco ................ 210/416.2
6,073,585 A * 6/2000 Horvath ................. 119/256
6,117,313 A * 9/2000 Goldman et al. .......... 210/151
6,837,991 B1 * 1/2005 Norris ................... 210/150

FOREIGN PATENT DOCUMENTS

GB     2372191        * 8/2002
JP     2004-357670    * 12/2004

* cited by examiner

*Primary Examiner*—Fred Prince (57) ABSTRACT

An improved and more efficient design for an air driven algae filtration system is achieved because there are no moving parts other than an air pump, and the air is used twice. After using air to circulate water through a filtration unit, the air, still under pressure, is separated from the water. The air is then plumbed to other apparatuses or used for cooling. This allows the filter to be utilized using less electricity. The water is de-gassed before reaching the algae filter. Therefore, no splash guard is necessary to prevent water from splashing the lights. With no splash guard, lower wattage lights can be used to illuminate the algae. This also increases the efficiency of this system. This filter also lends itself to maintaining a reef aquarium.

20 Claims, 8 Drawing Sheets

FILTRATION AND SURGE WITH NO MOVING PARTS

This is a CIP of application Ser. No. 11/284,123, filed Nov. 4, 2005, now abandoned.

FEDERALLY SPONSORED RESEARCH

Not Applicable.

SEQUENCE LISTING OR PROGRAM

Not Applicable.

BACKGROUND

1. Field of Invention

This invention relates to filtration systems, specifically an air driven system with surge, media filtration, algae filtration, and no moving parts other than an air pump and the ability to re-use pressurized air.

2. Discussion of Prior Art

Prior Art, (U.S. Pat. No. 3,768,200 to Klock) shows an outlet chamber to accept filtered liquid before it is either re-circulated or discharged. The separation chamber of the present invention is constructed to allow gravity to separate the pressurized water from the pressurized air, and then push the de-gassed water up to the isolation chamber, and the pressurized air to be captured. Klock has no such mechanism.

Klock shows conservation of carbon dioxide that is produced in his bacterial growth chamber to be used as an aid in algae growth. He states that the carbon dioxide can be introduced to his air lift or allowed to issue into a plastic dome that covers the algae. Klock shows no means to capture pressurized air to be used again, as does the present invention.

Klock's design shows all of the liquid flowing through filter media. The present invention shows media cartridges positioned in a highly turbulent area where, by design, the media cartridges are bathed in the water air mixture.

Klock has no diverter as shown in the present invention.

In Klock's invention, the water is not de-gassed before entering the filtration media. The divider in the present invention is constructed to separate the pressurized air from the water, allowing the pressurized air to be used again, and the de-gassed water to be isolated in the isolation chamber.

Prior art, (U.S. Pat. No. 5,647,983 to Limcaco and U.S. Pat. No. 6,837,991 to Norris) show a rotating algae drum. Many creatures commonly kept in reef aquaria, such as jaw fish, gobies, clown fish and many others disturb and disburse sand. With the water movement and surge necessary to keep a reef aquarium, these particles of sand are often introduced into the filtration system. Any moving parts therein, such as the rotating drum shown in these patents, can and do suffer excessive wear due to the abrasive nature of sand.

Prior Art, (U.S. Pat. No. 5,647,983 to Limcaco and U.S. Pat. No. 6,837,991 to Norris) show algae bathed in water that has not been de-gassed. This necessitates a splash guard over the algae to protect the lights. The resulting buildup of calcium carbonate and algae on the underside of the splash guard inhibit light penetration and adds the chore of cleaning the splash guard. This greatly increases the wattage necessary to illuminate the algae. Reef aquariums have typically been expensive to operate in terms of energy, keeping many people out of the hobby.

Prior art, (U.S. Pat. No. 6,808,624 to Norris) shows carbon filtration in an air driven system. Although the system provides effective carbon filtration, it incorporates a rotating drum that is prone to excessive wear due to the abrasive nature of sand.

Prior Art, (U.S. Pat. Nos. 5,647,983 and 5,755,961 to Limcaco) show a rotating algae drum that alternately submerge the algae in water, and then expose the algae to air. While this did provide a surge effect for the algae, if the algae drum ever stopped due to mechanical failure, power outage, etc., the algae on the part of the algae drum exposed to air would die. Again, the abrasive nature of sand is an issue with the system.

The media cartridge of the present invention is an entirely different design than what Limcaco teaches. Limcaco shows biological filtration inside a rotating drum. The present invention shows media cartridges in a fixed position.

Prior art, (U.S. Pat. No. 6,073,585 to Horvath) is not a water filtration system; rather it is a decorative device. Horvath has a sloping partitioning wall that is constructed to maintain a constant water level. The present invention is constructed to operate with a variable water level.

Horvath shows no diverter as shown in the present invention.

Horvath's sand fountain was not built to re-use pressurized air, nor could it reasonably be made to do so due to size constraints.

Horvath's decorative sand fountain does not show any type of media filtration as does the present invention.

Horvath's decorative sand fountain does not show an isolation chamber. Further, Horvath's invention must be submerged underwater, while my invention must not be submerged underwater.

OBJECTS AND ADVANTAGES

This invention relates to water filtration specifically an air driven system that uses no moving parts other than an air pump. Major features of this invention include the ability to capture pressurized air to be used a second time, and de-gassing the water.

This invention also lends itself to reef keeping.

Accordingly, several objects and advantages of the present invention are;

1. The air to drive the system is used twice, dramatically decreasing the electricity necessary to filter water.

2. The present invention shows media cartridges positioned in a highly turbulent area where, by design, the water air mixture separates in the immediate vicinity of the media cartridges. Organic pollutants have an affinity for a water air interface, concentrating these organics on the air bubbles of the air water mixture. The media cartridges are positioned to be bathed in this water air mixture at the place where the bubbles pop, which increases the effectiveness of carbon or other media.

3. No moving parts other than an air pump. The effect of abrasive sand moving through the filtration system is no longer an issue.

4. The algae filter does not require a splash guard to protect the lights because the water is de-gassed before entering the isolation chamber. The result is much better light penetration to the algae, which means lower wattage lights can be used, and less electricity is consumed. It also eliminates the maintenance chore of cleaning the underside of a splash guard.

5. Effective algae filtration is achieved with no moving parts.

6. Effective carbon filtration is achieved with no moving parts.

7. A simple and convenient means to export detritus is provided.

8. Live rock filtration is provided.

9. Water is circulated through the display tank and the filtration unit.

10. The present invention is constructed to operate with a variable water level, which provides algae chamber surge.

Nutrient export is easily achieved by;
(a) carbon replacement;
(b) detritus removal;
(c) algae harvesting.

This system achieves all these function with no moving parts to fail other than an air pump. The system is very simple to operate, is more reliable and cost far less money than currently available systems.

Further objects and advantages of this invention will become apparent from consideration of the drawing and ensuing description.

SUMMARY

The present invention relates to an improved and more efficient air driven algae filtration system. Air is used to circulate water through a filtration unit. The air, still under pressure, is then separated from the water and is used again to drive other devices or for cooling. The de-gassed water is directed through an algae filter. The water, being de-gassed, does not splash. Therefore, no splash guard is needed and less electricity is consumed.

The present invention also lends itself to reef keeping. Traditionally, reef aquariums have been complicated to operate and expensive to maintain in terms of energy consumption. The present invention makes it possible to maintain a reef aquarium with no moving parts other than an air pump. Proper water movement and surge for both the filter and the display tank are provided using a single air pump. Air is used to circulate water through a filtration unit and display tank. The air, still under pressure, is then separated from the water and is used again to drive surge devices.

Lower wattage lights can be used to illuminate the algae filter because no splash guard is necessary. This further increases the efficiency of this system.

REFERENCE NUMERALS IN DRAWINGS

P pump
1. filtration system
2. air lift tube
3. water air mixture
4. media cartridge
5. water
6. separation chamber
8. divider
9. airtight top
10. diverter
11. algae
12. isolation chamber
13. light
14. mesh
16. live rock
18. pressurized air
20. shutoff valve
21. filter drain
22. influent pipe
23. spillway
24. display tank
26. shallow reverse Carlson surge device
28. deep reverse Carlson surge device
30. effluent pipe 32. airline
34. one-way check valve
36. shutoff valve for air

BRIEF DESCRIPTION OF DRAWINGS

FIG. 4 illustrates in perspective the separation chamber and introduces the diverter. FIG. 4 also illustrates an influent pipe on the bottom of the isolation chamber.

DESCRIPTION

Figure 1:
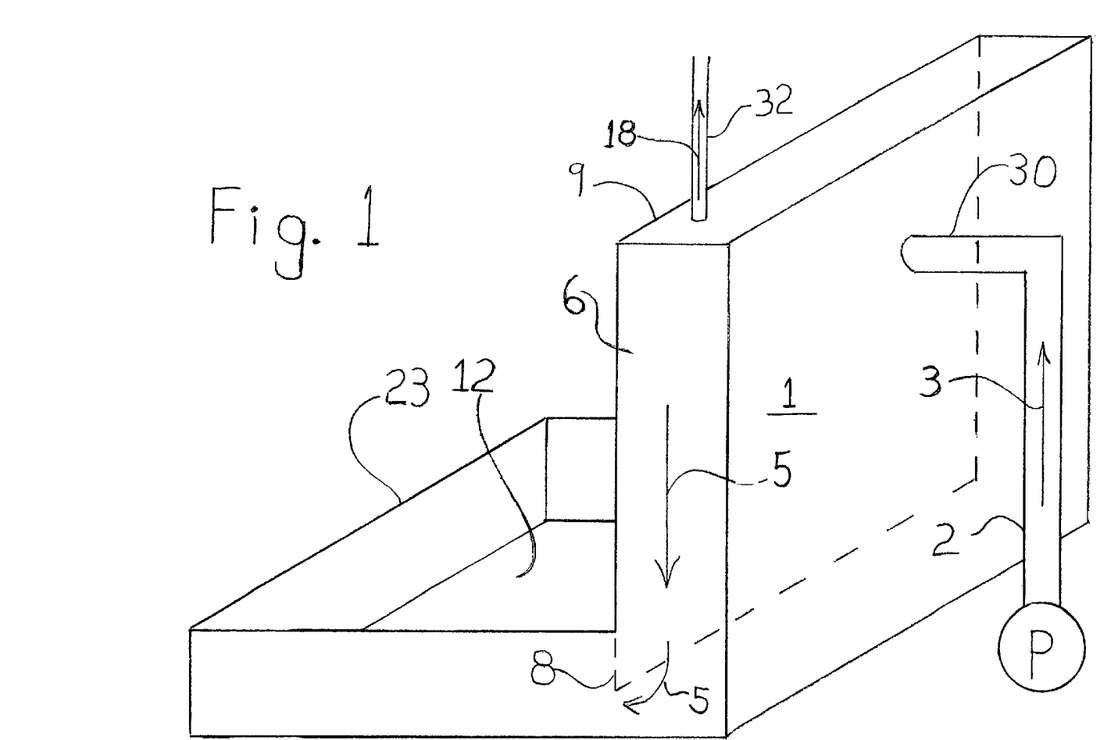
FIG. 1 illustrates in perspective how the divider forms the separation chamber, where the water is de-gassed and the air, still under pressure can be used again.
Figure 2:
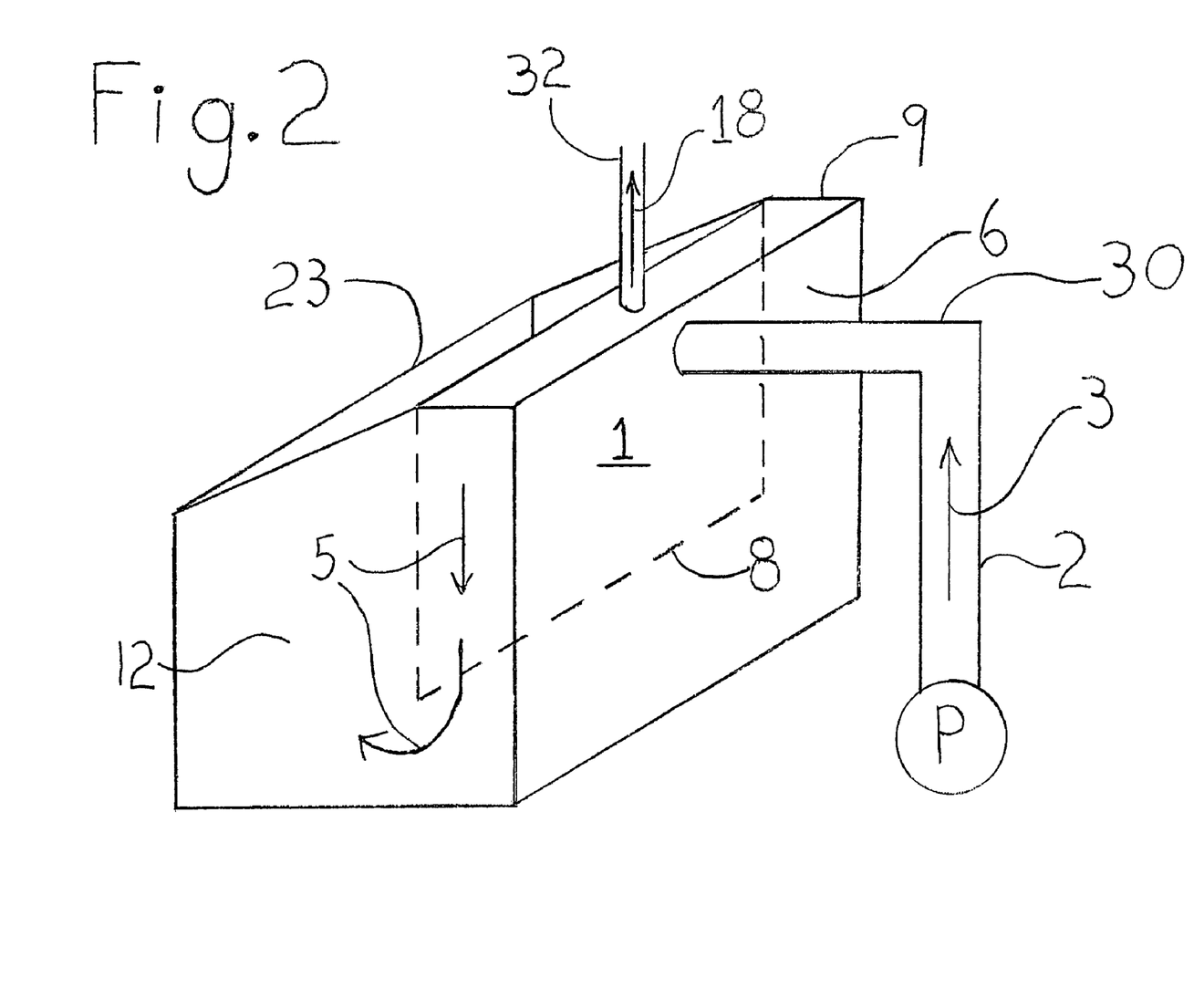
FIG. 2 illustrates in perspective the separation chamber and has a raised spillway.
Figure 3:
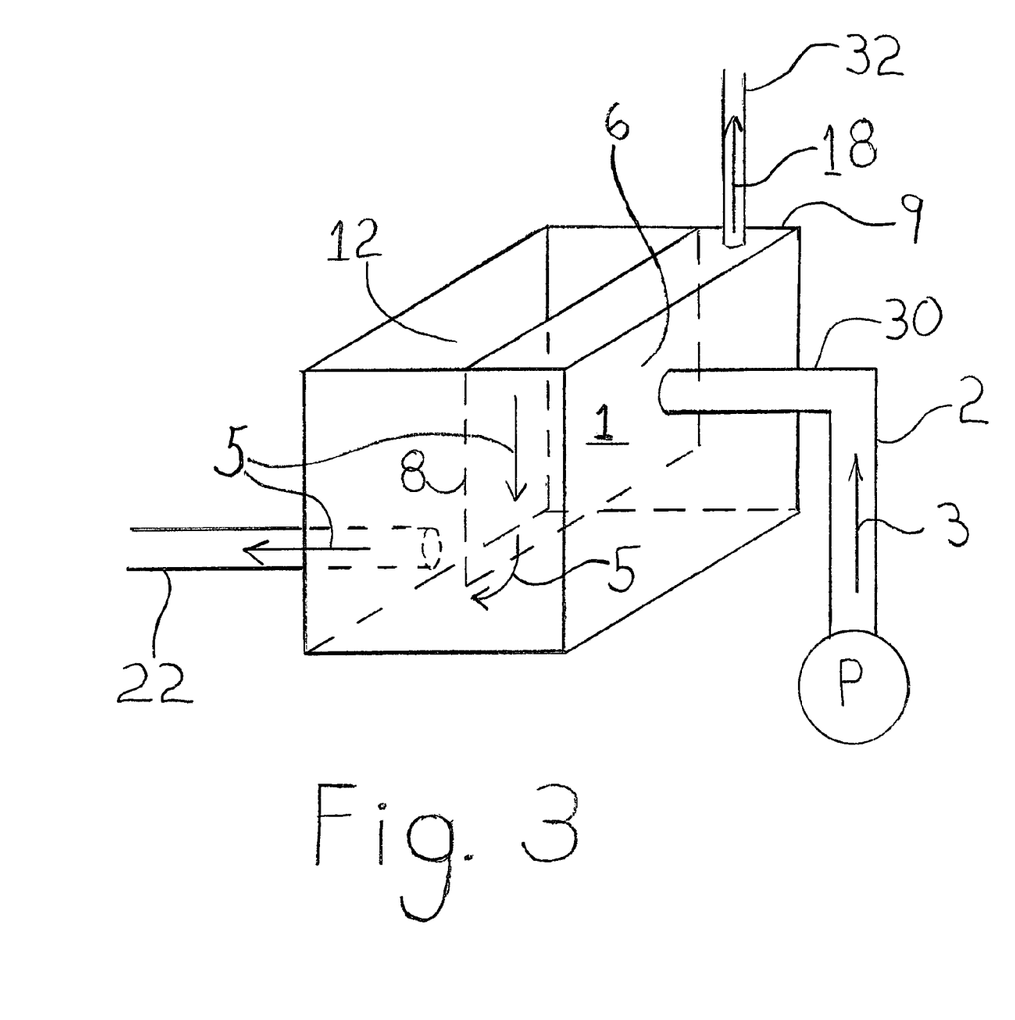
FIG. 3 illustrates in perspective the separation chamber and incorporates an influent pipe on the side of the isolation chamber to replace the spillway.

Preferred embodiments of my filtration system 1 are shown in FIGS. 1, 2 and 3. Water is urged to the filter utilizing an air lift tube 2 that is located upstream from the filtration system 1. Air lift tube 2 is driven by an air pump P. As air enters the air lift tube 2, the air combines with water in need of treatment and the resulting water air mixture 3 is driven into an enclosed separation chamber 6 via effluent pipe 30. Separation chamber 6 is formed by placing a divider 8 inside the filtration system 1, and adding an airtight top 9 to the separation chamber 6. The divider 8 is positioned vertically and sealed airtight at the top and sides and open at the bottom. There is an airline 32 plumbed into the top portion of separation chamber 6. Under normal operating conditions, the only escape for the pressurized air 18 from the separation chamber 6 is through airline 32. The pressurized air 18 can then be re-utilized for a variety of applications including cooling, or driving other devices.

The separation chamber 6 is designed to have a variable water level, with the lower limit just above the bottom of the divider 8. This ensures that all of the pressurized air 18 exits the separation chamber 6 through airline 32, and the water 5 is de-gassed before moving to the next component of the filter. The upper limit of the water level in the separation chamber 6 is just below the airline 32.

If the pressurized air 18 were ever to escape past the bottom of divider 8, the divider 8 must be made deeper, or the air pressure must be reduced, or resistance must be reduced at airline 32.

Figure 7:
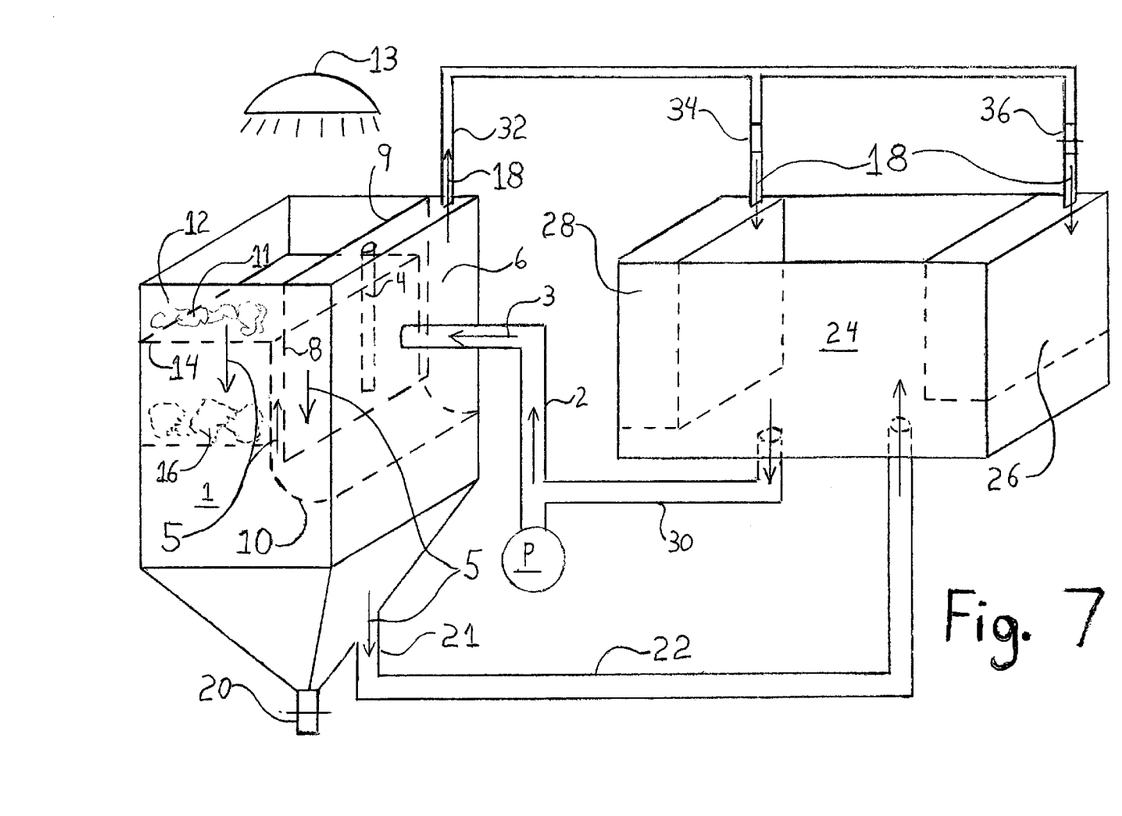
FIG. 7 illustrates in perspective the present invention connected to an aquarium with air driven surge devices.

Media cartridges 4 can be installed inside the separation chamber 6 in close proximity to where the water air mixture 3 enters the separation chamber 6, as shown in FIG. 7. Organic pollutants have an affinity for a water-air interface, so the surface of the bubbles in the water air mixture 3 has a concentration of organic pollutants. As the water air mixture 3 enters the separation chamber 6, the organic laden bubbles burst in the immediate vicinity of the media cartridges 4, increasing their efficiency. The media cartridges 4 could be refillable or disposable. The media cartridges 4 could either held in a fixed position or tethered with a flexible material.

As the water air mixture 3 enters the separation chamber 6, the water 5 falls to the bottom as gravity separates it from the pressurized air 18. The de-gassed water 5 is then forced past the bottom of divider 8, and into the isolation chamber 12.

The isolation chamber 12 is open to the atmosphere and has a minimum water level defined by the bottom of divider 8. In the isolation chamber 12, water 5 can be filtered biologically, chemically, mechanically, with algae 11 or with other means. After treatment, the water 5 can utilize a spillway 23, as shown in FIGS. 1 and 2. The water 5 can also exit the isolation chamber 12 from the side as shown in FIG. 3 or the bottom as shown in FIGS. 4, 5, 6 and 7 through influent pipe 22.

Figure 4:
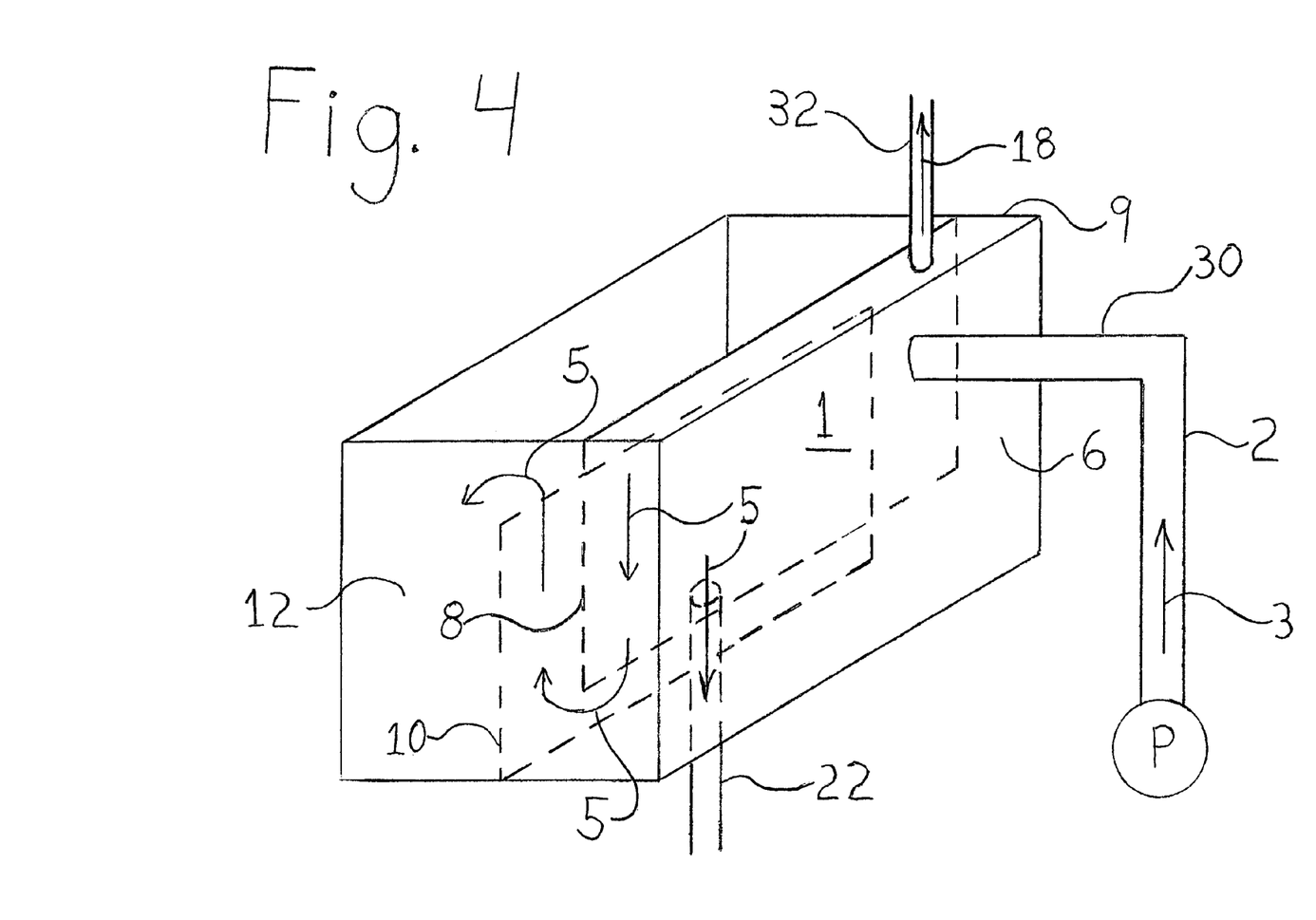
Figure 4A:
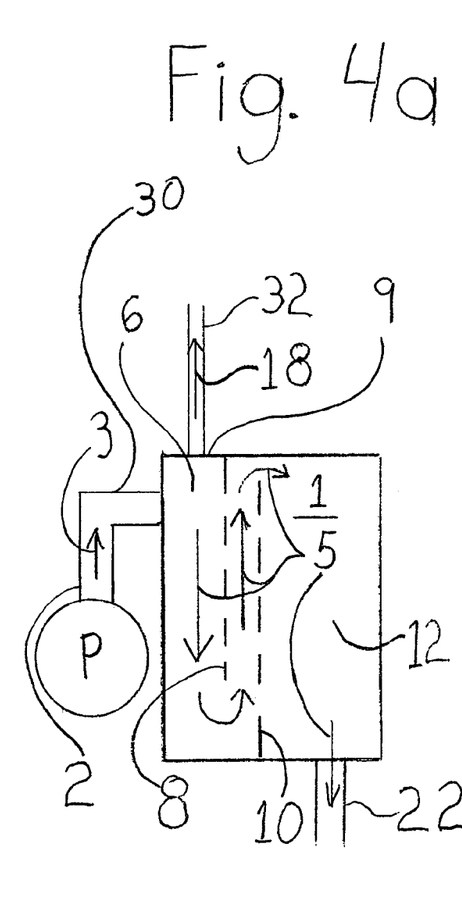
FIG. 4a is a side view of FIG. 4.
Figure 5:
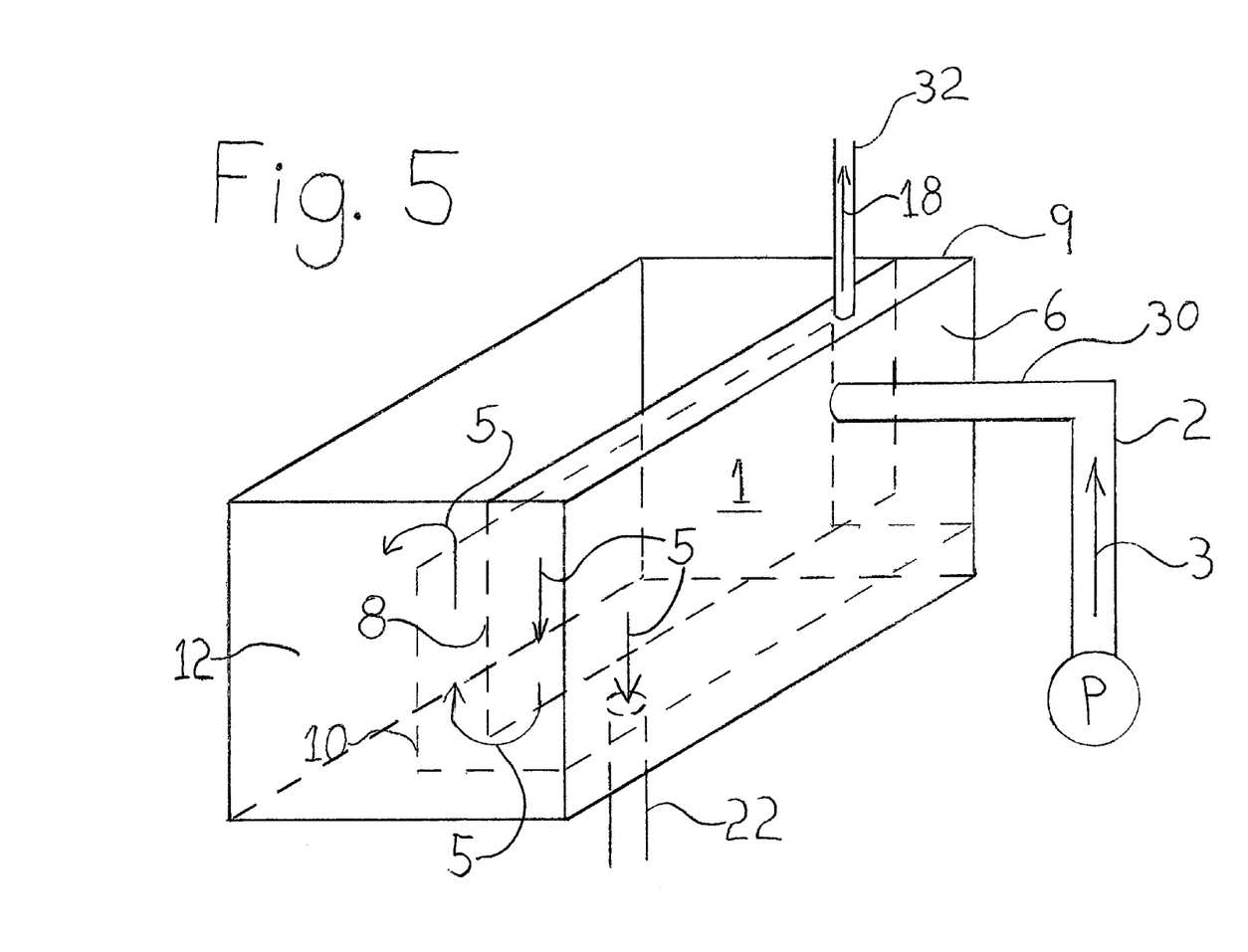
FIG. 5 illustrates in perspective an L shaped diverter.
Figure 5A:
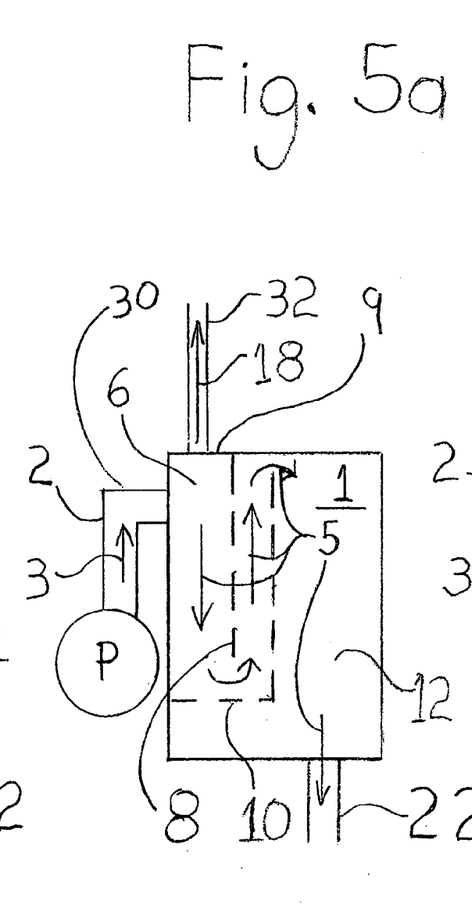
FIG. 5a is a side view of FIG. 5.
Figure 6:
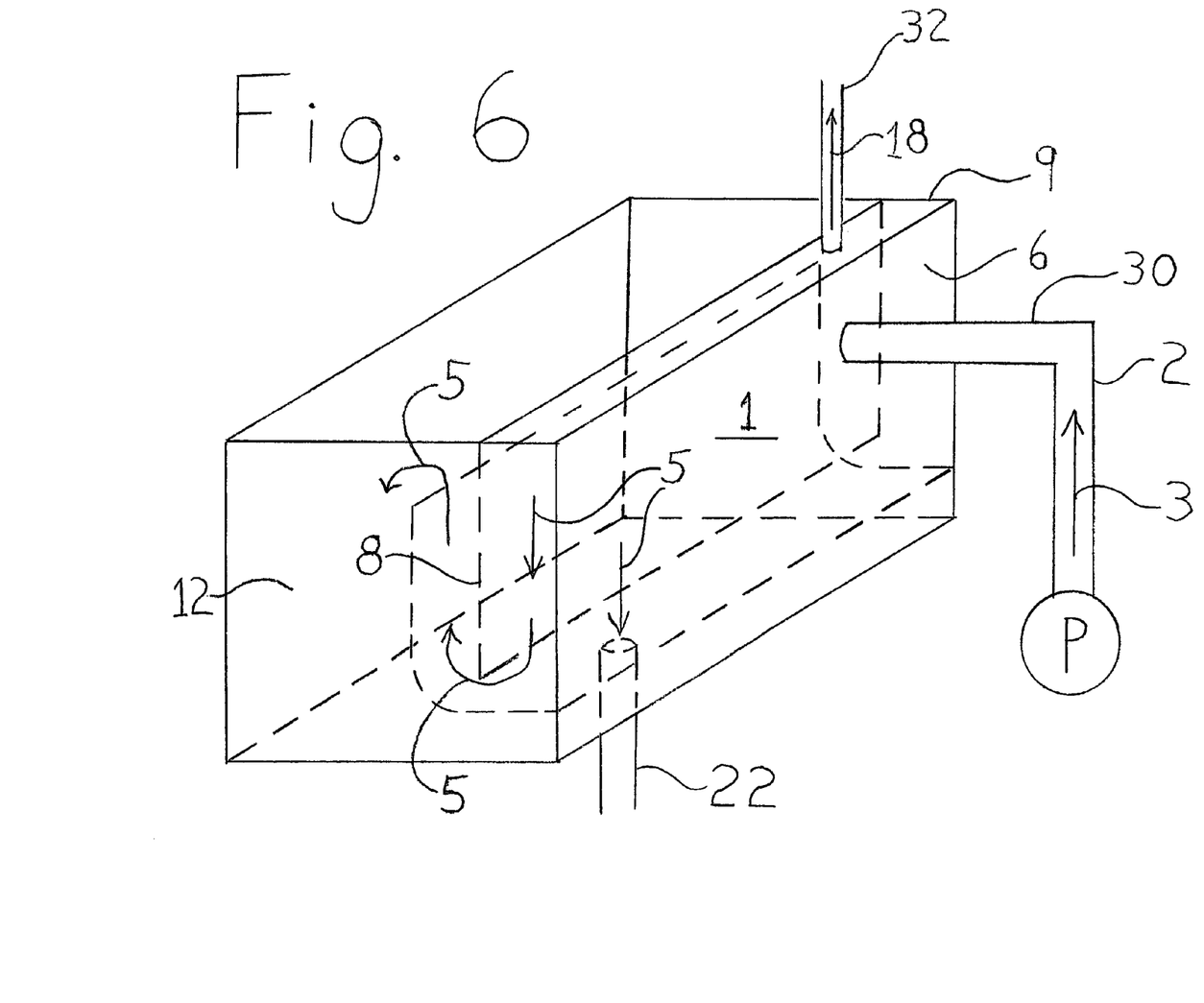
FIG. 6 illustrates in perspective a J shaped diverter.
Figure 6A:
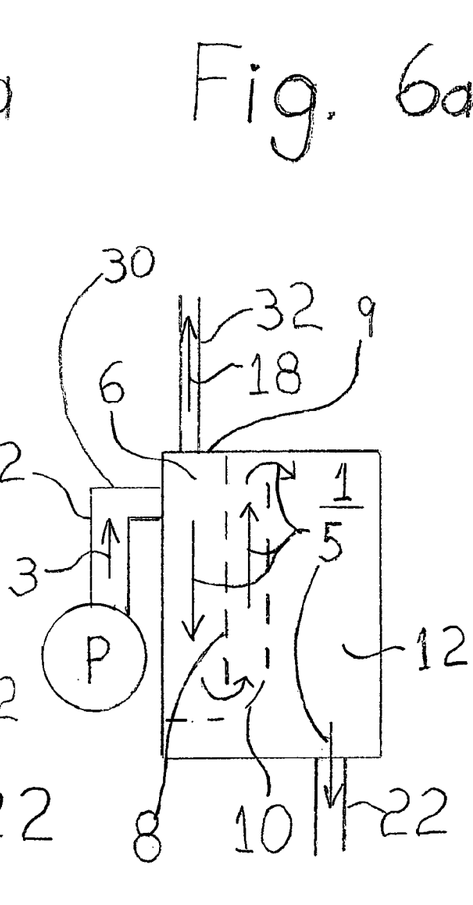
FIG. 6a is a side view of FIG. 6.

A further embodiment to my filter includes a diverter 10. The diverter 10 is adjacent to and downstream from the divider 8. I prefer a J shaped diverter 10 as shown in FIGS. 6, 6a and 7. Other shapes would work including straight flat, as shown in FIGS. 4 and 4a, or L shaped as shown in FIGS. 5 and 5a. Other shapes may come to mind. In any configuration, the diverter 10 is open to the atmosphere at the top, and sealed at the sides and bottom, enclosing the downstream side of divider 8. This forces the water 5 to enter the isolation chamber 12 from the top. This is advantageous because if influent pipe 22 is used, the water 5 must travel from the top of the isolation chamber 12 to the bottom, maximizing contact time with any filtration media that might be utilized in the isolation chamber 12. This is especially advantageous if algae filtration is used. The algae 11 can be held in place at the top of the isolation chamber 12 with a mesh 14. The diverter 10 forces all the water 5 to flow directly through the algae 11. With the algae 11 positioned at the top of the isolation chamber 12, maximum light penetration is achieved. Because the water 5 is de-gassed before reaching the isolation chamber 12, no splashguard is necessary. Therefore, if artificial light is used, wattage can be minimized.

Another embodiment of my filtration system 1 is directed toward the art of reef keeping and incorporates reverse Carlson surge devices as shown in FIG. 7.

(Reverse Carlson surge devices are well known in the art of reef keeping. The description for a reverse Carlson surge device by Kevin Carpenter can be found in Aquarium Systems' Seascope publication, Volume 17, Winter 2000).

There is a growth of algae 11 in the isolation chamber 12. The algae 11 are illuminated by light 13. The water 5 that enters the isolation chamber 12 is de-gassed, so there is no need for a lid or splashguard over the isolation chamber 12. Therefore, less wattage is required to grow algae 11. The algae 11 utilize impurities in the water 5 as fertilizer for growth. The algae 11 are held in place by a mesh 14. The water 5 exits the top of isolation chamber 12 and travels down past racks of live rock 16. Filter feeders on the live rock 16 further purify the water 5 while at the same time releasing plankton that feed display tank 24 inhabitants. The filtered water exits the filtration system 1 at filter drain 21 as shown in FIG. 7. Filter drain 21 exits the filtration system 1 near, but not at, the bottom so as not to pick up detritus. The purified water then travels to the display tank 24 by way of influent pipe 22. The bottom of the filtration system 1 can be tapered to form a detritus trap with a shut off valve 20 at the bottom. This will allow an easy and convenient way to remove detritus from the system. Shut off valve 20 also makes water changes easy.

Pressurized air 18 exits the separation chamber 6 through airline 32 and is plumbed to reverse Carlson surge devices 26 and 28, which are situated in display tank 24. Reverse Carlson surge device 28 is deeper than reverse Carlson surge device 26. Divider 8 must be deeper than both reverse Carlson surge devices. This is so the pressurized air 18 will actuate the reverse Carlson surge devices 26 and 28 before the water level in the separation chamber 6 reaches the bottom of divider 8.

As the water level in the Carlson surge devices 26 or 28 change, the water level in the separation chamber 6 also changes, at the same rate, with both water levels always remaining equal because the separation chamber 6 and the reverse Carlson surge devices 26 and 28 are always exposed to the identical air pressure as shown in FIG. 7. At the same time, the water level in the isolation chamber 12 and the display tank 24 are constantly changing at the same rate, with both water levels always remaining equal because the isolation chamber 12 and the display tank 24 are in fluid communication, as shown in FIG. 7. This provides surge for the algae 11 in the isolation chamber 12 due to the sudden water level change in the separation chamber 6 and the sudden water level change in the isolation chamber 12 when the reverse Carlson surge device actuates. Surge is very beneficial to algae growth. (See *Dynamic Aquaria Building Living Ecosystems*, page 236, by Walter H. Adey and Karen Loveland, copyright 1991, by Academic Press Inc.)

The deeper reverse Carlson surge device 28 has a one-way check valve 34 installed on the airline 32. The shallower reverse Carlson surge device 26 has a shut off valve 36 installed on the airline 32. With the shut off valve 36 open, only the shallower reverse Carlson surge device 26 will surge. In this position, the one-way check valve 34 on the deeper reverse Carlson surge device 28 will prevent the water from moving up and down in the deeper reverse Carlson surge device 28 every time the shallower reverse Carlson surge device 26 surges. This increases overall efficiency. When the valve 36 on the shallower reverse Carlson surge device 26 is closed, only the deeper reverse Carlson surge device 28 will surge. One option is to replace the shut off valve 36 with an actuated ball valve timed to open and close at three hour intervals to mimic the tide. In this configuration, the two surge devices would surge alternately for three hours each, and all of the air is used twice. Once to move the water through the filtration system 1 and display tank 24 and then again to drive the reverse Carlson surge devices 26 and 28.

It is advantageous to have the ability to surge from more than one position in a reef aquarium. This helps eliminate dead spots in the water that allow detritus to accumulate on sessile animals.

Another configuration could simply use a single reverse Carlson surge device which would use all of the air twice.

Two reverse Carlson surge devices equal in depth could be used. The one-way check valve 34 and the shut off valve 36 could be eliminated. In this configuration, both reverse Carlson surge devices would surge simultaneously. This configuration also uses all the pressurized air 18 twice.

Another possible configuration would be to provide air directly to a reverse Carlson surge device. A shut off valve would control surge frequency. The same pump would deliver air to an airlift to move the water air mixture 3 to the separation chamber 6. The pressurized air 18 from the separation chamber 6 could drive a second reverse Carlson surge device. The second reverse Carlson surge device would also need a shut off valve to control frequency of surge. In this configuration, only some of the air is used twice but the reverse Carlson surge devices are operating independently of one another.

While I favor the use of reverse Carlson surge devices, the pressurized air coming from the separation chamber 6 could be used for a variety of purposes such as cooling or running a protein skimmer.

From the description above, a number of advantages of my filtration system become evident;

1. A complete filtration and surge system is possible with no moving parts other than an air pump.
2. The reliability and durability inherent to a simple design increase the overall dependability and efficiency of this system.
3. Pressurized air is captured to be used again.
4. The water in the isolation chamber is de-gassed, eliminating the need for a cover to protect lights from splashing.
5. When a Carlson surge device is incorporated, surge is provided in the isolation chamber for algae.
6. A reef aquarium can be run using far less electricity.

This filtration system could be constructed from many different materials including concrete, metal, plastic, glass, and coated plywood. It could be very many different shapes and sizes. I currently favor acrylic for the fabrication.

CONCLUSION

The reader will see that this filtration system makes it possible to treat water using less electricity. With no moving parts other than an air pump, the system also provides ease and simplicity of operation and the durability and reliability inherent to a simple design. While the above description contains one main embodiment, the invention is intended to cover all variations of this invention.

Some modifications have been suggested and others may come to mind. The scope of the invention should be determined not by the embodiments shown, but by the appended claims and their legal equivalents.

What is claimed is:

1. An air driven water filter comprising;
   (a) a filtration system having an effluent pipe and a means to discharge influent;
   (b) said filtration system containing a means for providing a water air mixture;
   (c) said means for providing a water air mixture situated at said effluent pipe, upstream from said filtration system, whereby water in need of treatment is delivered to said filtration system;
   (d) said effluent pipe is plumbed directly into a separation chamber, whereby gravity separates said water air mixture;
   (e) said separation chamber having an airtight top;
   (f) said separation chamber also including a substantially vertical divider, said divider being sealed at the sides and top and open at the bottom, the bottom of said divider defining the lower limit of the water level inside said separation chamber, whereby said water air mixture is degassed and the degassed water is allowed to exit said separation chamber from the bottom to be treated in an isolation chamber;
   (g) said isolation chamber is open to the atmosphere;
   (h) said separation chamber further containing a means for capturing pressurized air, said means for capturing pressurized air being above the water level in said separation chamber, whereby said pressurized air can be used again.

2. The filter of claim 1 wherein said means to discharge influent include a spillway.

3. The filter of claim 1 wherein said means to discharge influent also include an influent pipe.

4. The filter of claim 1 wherein said means for providing a water air mixture include an air pump and an air lift tube.

5. The filter of claim 1 wherein said means for capturing pressurized air include an airline.

6. The filter of claim 1, further including a substantially vertical diverter that is adjacent to and downstream from said divider, said diverter being sealed at the bottom and sides, with the top being open to the atmosphere, whereby said degassed water is urged to the top of said isolation chamber for more effective treatment.

7. The diverter of claim 6 wherein said diverter is substantially J shaped.

8. The diverter of claim 6 wherein said diverter is substantially L shaped.

9. The diverter of claim 6 wherein said diverter is substantially flat.

10. The filter of claim 6, further including at least one reverse Carlson surge device connected to said airline, said Carlson surge device situated in a display tank that is in fluid communication with said filter, whereby surge is provided to said algae in said isolation chamber from the sudden changes in pressure and water level that are inherent to the operation of said reverse Carlson surge device.

11. The separation chamber of claim 1, further including at least one media cartridge inside said separation chamber.

12. The media cartridge of claim 11 wherein said media cartridge is in a fixed position inside said separation chamber in close proximity to said effluent pipe, whereby said water air mixture is exposed to said media cartridge.

13. The media cartridge of claim 12 wherein said media cartridge is suspended by a flexible material.

14. The media cartridge of claim 11 wherein said media cartridge is disposable.

15. The media cartridge of claim 11 wherein said media cartridge is re-usable.

16. The isolation chamber of claim 1, further including a mesh, whereby filtration media is held in place.

17. The isolation chamber of claim 1 further including algae filtration.

18. The isolation chamber of claim 1 further including chemical filtration.

19. The isolation chamber of claim 1 further including biological filtration.

20. The isolation chamber of claim 1 further including mechanical filtration.

* * * * *